United States Patent
Paczkowski et al.

(10) Patent No.: US 12,423,266 B2
(45) Date of Patent: Sep. 23, 2025

(54) SYSTEMS AND METHODS FOR IMMUTABLE ARCHIVING OF USER EQUIPMENT CONNECTION DATA FOR WIRELESS COMMUNICATIONS NETWORKS

(71) Applicant: T-Mobile Innovations LLC, Overland Park, KS (US)

(72) Inventors: Lyle Walter Paczkowski, Mission Hills, KS (US); Oliver Philippe Coudert, Arlington, VA (US); Alfred Richard Balakier, Kirkland, WA (US); Ronald Richard Marquardt, Woodinville, WA (US)

( * ) Notice: Subject to any disclaimer, the term of this patent is extended or adjusted under 35 U.S.C. 154(b) by 241 days.

(21) Appl. No.: 17/560,709

(22) Filed: Dec. 23, 2021

(65) Prior Publication Data

US 2023/0205733 A1 Jun. 29, 2023

(51) Int. Cl.
*G06F 16/13* (2019.01)
*H04B 17/318* (2015.01)
(Continued)

(52) U.S. Cl.
CPC ......... *G06F 16/137* (2019.01); *H04B 17/318* (2015.01); *H04B 17/345* (2015.01);
(Continued)

(58) Field of Classification Search
None
See application file for complete search history.

(56) References Cited

U.S. PATENT DOCUMENTS 9,294,468 B1 * 3/2016 Kilbourn ............... H04L 9/3263
2006/0294260 A1 * 12/2006 Young ................... H04L 41/08
709/200

(Continued)

FOREIGN PATENT DOCUMENTS

WO WO-2020143502 A1 * 7/2020 ......... H04L 12/1403

OTHER PUBLICATIONS

3GPP, "3rd Generation Partnership Project; Technical Specification Group Services and System Aspects; Procedures for the 5G System (5GS); Stage 2 (Release 17)", 3GPP TS 23.502 V17.5.0 (Jun. 2022), 744 pages.

(Continued)

*Primary Examiner* — Gennadiy Tsvey
(74) *Attorney, Agent, or Firm* — Shook, Hardy & Bacon LLP

(57) ABSTRACT

Systems and methods for immutable archiving of UE connection data for wireless communications networks are provided. In one embodiment, a method comprises: detecting when a UE has initiated access to a network operator core through a radio access network; determining whether a witness data collection service is to be activated for the UE; when the witness data collection service is to be activated: activating the wireless data collection service for a UE monitoring session; initiating transmission of a UE monitoring session block sequence from the UE to the network operator core, wherein the session block sequence comprises blocks each comprising collected witness data characterizing a connection between the UE and the network operator core during the UE monitoring session; determining when the UE monitoring session is complete; closing the session block sequence to form a ledger archive and storing the ledger archive to an immutable witness data archive.

19 Claims, 9 Drawing Sheets

(51) Int. Cl.
*H04B 17/345* (2015.01)
*H04L 9/00* (2022.01)
*H04L 9/32* (2006.01)
*H04W 24/10* (2009.01)

(52) U.S. Cl.
CPC ........... *H04L 9/3239* (2013.01); *H04W 24/10* (2013.01); *H04L 9/50* (2022.05)

(56) References Cited

U.S. PATENT DOCUMENTS

| | | | | |
|---|---|---|---|---|
| 2013/0005381 | A1* | 1/2013 | Turkka | G01S 11/06 455/517 |
| 2016/0275461 | A1* | 9/2016 | Sprague | H04W 12/06 |
| 2016/0381701 | A1* | 12/2016 | Kwok | H04L 1/0041 370/329 |
| 2020/0155944 | A1* | 5/2020 | Witchey | A63F 13/86 |
| 2020/0312046 | A1* | 10/2020 | Righi | G07C 5/008 |
| 2020/0313985 | A1* | 10/2020 | Jayakumar | H04L 41/14 |
| 2020/0396787 | A1* | 12/2020 | Brugman | G08B 21/0272 |
| 2023/0291800 | A1* | 9/2023 | Grimminger | H04M 1/72415 |

OTHER PUBLICATIONS

3GPP, "3rd Generation Partnership Project; Technical Specification Group Radio Access Network; NG-RAN; Architecture description (Release 17)", 3GPP TS 38.401 V17.1.1 (Jul. 2022), 122 pages.

3GPP, "3rd Generation Partnership Project; Technical Specification Group Radio Access Network; NR; Radio Resource Control (RRC) protocol specification (Release 17)", 3GPP TS 38.331 V17.1.0 (Jun. 2022), 1273 pages.

3GPP, "3rd Generation Partnership Project; Technical Specification Group Core Network and Terminals; Non-Access-Stratum (NAS) protocol for 5G System (5GS); Stage 3; (Release 17)", 3GPP TS 24.501 V17.7.1 (Jun. 2022), 991 pages.

* cited by examiner

UE MONITORING SESSION BLOCK SEQUENCE

BLOCK SEQUENCE # $B_0$ (GENESIS BLOCK)

| UE ID 312 | UE NOTARIZATION STAMP 314 | COLLECTED WITNESS DATA 316 |

BLOCK SEQUENCE # $B_1$

| UE ID 312 | UE NOTARIZATION STAMP 314 | COLLECTED WITNESS DATA 316 |

• • •

BLOCK SEQUENCE # $B_{n-1}$

| UE ID 312 | UE NOTARIZATION STAMP 314 | COLLECTED WITNESS DATA 316 |

BLOCK SEQUENCE # $B_n$ (TERMINAL BLOCK)

| UE ID 312 | UE NOTARIZATION STAMP 314 | COLLECTED WITNESS DATA 316 |

FIG. 3A

SYSTEMS AND METHODS FOR IMMUTABLE ARCHIVING OF USER EQUIPMENT CONNECTION DATA FOR WIRELESS COMMUNICATIONS NETWORKS

BACKGROUND

Recent advancements in various forms of artificial intelligence and computer processing have resulted an explosion in the development of autonomous vehicles and myriads of other autonomous machines. For example, several major automakers are developing autonomous vehicles, though many are not yet fully autonomous. Other autonomous machines under development include airborne vehicles, like drones, urban air mobility (UAM) vehicles, passenger aircraft, and non-mobile machines, such as manufacturing equipment, robots or building systems. Particularly with respect to motorcars, most cars today feature automations such as cruise control, electronic stability control, forward-collision warning, automated emergency braking, and self-parking. The Society of Automotive Engineers (SAE) refers to these as being level 1 or level 2 driver support systems on the SAE 5-level automation classification system as an active and engaged driver is still required. Some production automobiles now have reached level 3 automation which involves conditional driving automation providing at least a limited degree of driver assistance, potentially utilizing artificial intelligence to make decisions based on changing conditions around the vehicle. That said, the goal of the automotive industry is to develop vehicles having level 5 full driving automation where a vehicle can drive itself between selected destinations without human interaction under all potential driving conditions.

Many autonomous and semi-autonomous machines will operate, at least in part, on data delivered or accessed via a wireless communications network operated by a wireless services provider (i.e., a wireless carrier). The data may include information about environmental or traffic conditions relevant to operation of the machine, but may also include operating commands originating from one or both of machine and remote human operators (e.g. remote control commands). It follows that when an incident occurs where the operation of the machine causes property damage or personal injury, a question may arise as to whether the incident occurred as the result of a communications loss or degradation involving the wireless communications network. Just as humans are witness to incidents created by human decisions and actions, when machines made decisions create incidents, captured and stored data can serve as a "witness" to the incident.

SUMMARY

The present disclosure is directed, in part to immutable archiving of user equipment connection data for wireless communications networks, substantially as shown and/or described in connection with at least one of the Figures, and as set forth more completely in the claims.

In one embodiment, a system for collecting wireless user equipment connection data for an immutable witness data archive comprises: at least one controller configured to execute one or more network functions of a network operator core for a wireless communications network, wherein the network operator core is configured to communicate with one or more user equipment (UE) over one or both of uplink (UL) radio frequency (RF) signals and downlink (DL) RF signals, the one or more network functions including: an operator core witness data collection module coupled to an immutable witness data archive, wherein the operator core witness data collection module is configured to receive a UE monitoring session block sequence from a distributed witness data collection application executing on a first UE coupled to the network operator core, the UE monitoring session block sequence comprising a sequence of blocks each comprising collected witness data characterizing a connection between the first UE and the network operator core; and wherein the operator core witness data collection module is configured to store the UE monitoring session block sequence as a ledger archive to the immutable witness data archive based on when a UE monitoring session associated with the first UE is completed.

In another embodiment, a method for collecting and archiving witness data for user equipment (UE) in communication with a wireless network operator core comprises: detecting when a UE has initiated access to a network operator core through a radio access network; determining whether a witness data collection service is to be activated for the UE; when the witness data collection service is to be activated for the UE: activating the wireless data collection services for a UE monitoring session; initiating transmission of a UE monitoring session block sequence from the UE to the network operator core, wherein the UE monitoring session block sequence comprises a sequence of blocks each comprising collected witness data characterizing a connection between the UE and the network operator core during the UE monitoring session; determining when the UE monitoring session is complete; and when the UE monitoring session is complete, closing the UE monitoring session block sequence to form a ledger archive and storing the ledger archive to an immutable witness data archive.

In another embodiment, a method for collecting and archiving witness data for user equipment (UE) in communication with a wireless network operator core comprises: detecting when a UE has obtained access to a network operator core through a radio access network; determining whether a witness data collection service is to be activated for the UE; when the witness data collection service is to be activated for the UE: activating wireless data collection services for a UE monitoring session; initiating transmission of a UE monitoring session block sequence from the UE to the network operator core, wherein the UE monitoring session block sequence comprises a sequence of blocks each comprising collected witness data characterizing a connection between the UE and the network operator core during the UE monitoring session; determining when the UE monitoring session is complete; and when the UE monitoring session is complete, communicating a terminal block of the UE monitoring session block sequence to the network operator core.

In various embodiments, the collected witness data may comprise one or both of RF service quality related data or UE telemetry data. For example, the collected witness data may comprise connection data for the UE related to at least one of: downlink signal strength; downlink interference strength; downlink signal frequency; downlink signal channel; and a downlink transmitter identification. In some embodiments, an operator core witness data collection module generates the ledger archive using at least one of a distributed ledger technology (DLT), a Hyperledger technology, or a block-chain technology.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein:

FIGS. 3A and 3B are diagrams illustrating an example UE monitoring session block sequence, in accordance with some embodiments described herein;

DETAILED DESCRIPTION

Figure 1A:
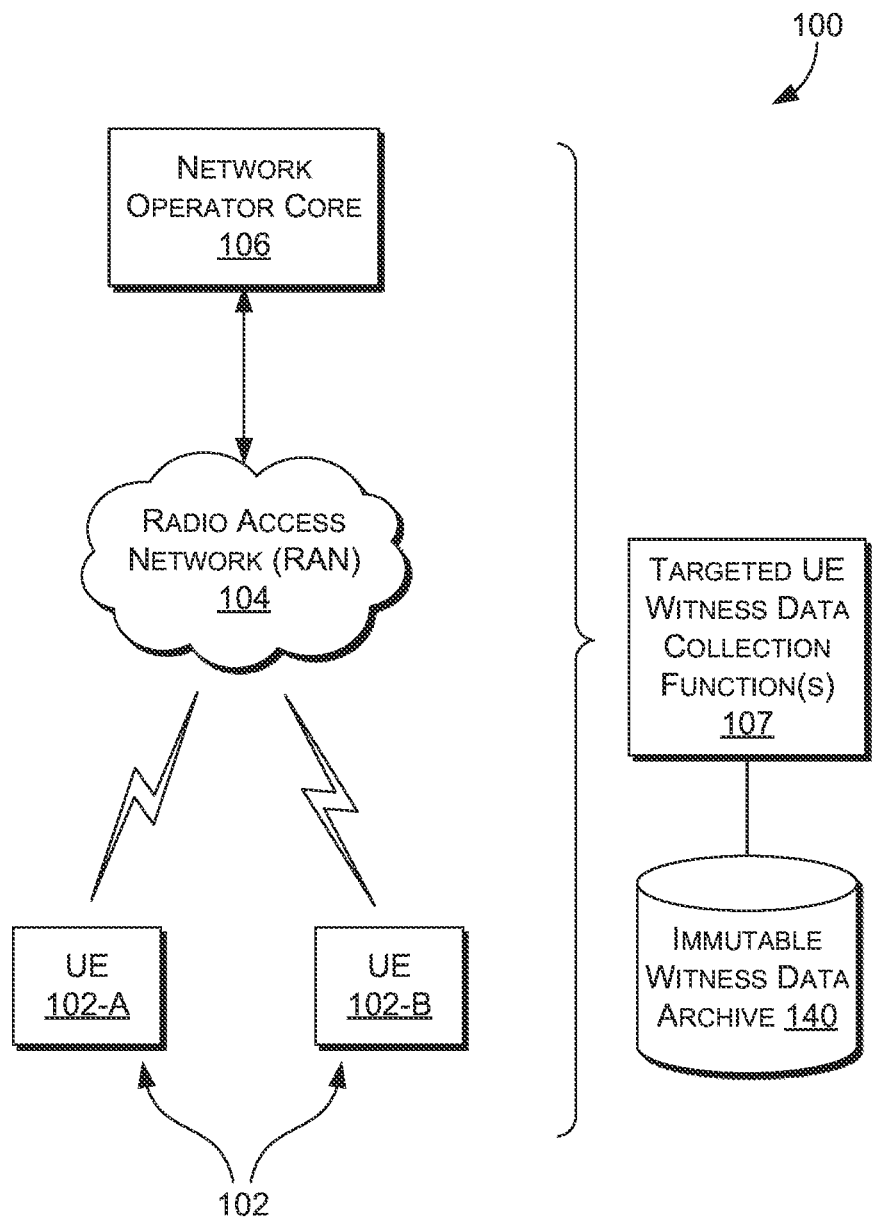
FIGS. 1A and 1B are diagrams illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, the creation, capture and/or compression of wireless telecommunications connection data relevant to witnessing the quality and characteristics of communications links for a connection providing data to autonomous machinery over a wireless communications network. Such data is then provided to an immutable connection service repository for archive. As further described below, the wireless telecommunications connection data (referred to herein as "connection data") is both captured and preserved in a manner that establishes sufficient integrity for the data to serve as "witness data" for the purpose of establishing an immutable record of what network conditions existed preceding and during events or incidents involving specific user equipment (UE) connected to the wireless communication provider's core network. In some embodiments, the type of data collected to serve as witness data is determined from considerations such as, the device type of the UE, specific automated functions performed by the UE or the type of vehicle telemetry captured at the UE, and/or the type or service level (for example, the network slice) being offered to that UE by the wireless communications network. Moreover, the capture witness data may be transmitted to a connection service repository, which in the context of this disclosure is referred to herein as an "immutable witness data archive". From the immutable witness data archive, the connection data can later be retrieved for use as witness data in response to an investigation involving a UE incident. In some embodiments, distributed ledger technology (DLT) or other block-chain related technology is utilized to securely capture and store the witness data to ensure that the immutable witness data archive contains data having integrity and free from manipulation.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

It should be understood that the UE discussed herein are not limited to handheld personal computing devices such as cellular phones, tablets, and similar consumer equipment, but includes other forms of equipment and machines such as autonomous or semi-autonomous vehicles including cars, trucks, trains, aircraft, urban air mobility (UAM) vehicles, drones, robots, exoskeletons, manufacturing tooling, and other high science appliances, for example. Moreover, the UE need not be limited to mobile UE as other UE examples include stationary UE applications where witness data is desirable for establishing facts regarding events involving wireless connections. Examples of stationary UE applications include, but are not limited to, internet-of-things (IoT) devices, smart appliances, thermostats, locks, smart speakers, lighting devices, smart receptacles, controllers, mechanical actuators, remote sensors such as traffic sensors, weather or other environmental sensors, wireless beacons, and the like.

FIG. 1A is a diagram illustrating an example network environment 100 embodiment. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

As shown in FIG. 1A, network environment 100 comprises a network operator core 106 that provides one or more wireless network services to one or more UE 102 via a radio access network (RAN) 104, often referred to as a base station. RAN 104 may be referred to as an eNodeB in the context of a 4G Long-Term Evolution (LTE) implementation, a gNodeB in the context of a 5G New Radio (NR) implementation, or other terminology depending on the specific implementation technology. In particular, each UE 102 communicates with the network operator core 106 via the RAN 104 over one or both of uplink (UL) radio frequency (RF) signals and downlink (DL) RF signals. The RAN 104 is coupled to the network operator core 106 by a network (not shown) that comprises wired and/or wireless network connections that may themselves include wireless relays and/or repeaters. In some embodiments, the RAN 104 is coupled to the network operator core 106 at least in part by the Internet or other public network infrastructure. During normal operation of the network environment 100, the creation of operational logs, particularly by the RAN 104, is expansive and are volumetric, but do not capture connection quality information that can be correlated to specific UEs 102, and are only kept for a short period of time. Log files may not be stored in a protected state and the provenance of the data cannot be assured if the data were needed to serve as witness data associated with a UE incident.

In the embodiment shown in FIG. 1A, connection data (which may include combinations of wireless connection quality information, network configuration and network states, UE configuration and device states, or other network related statistics, as discussed below) is captured by one or more targeted UE witness data collection functions 107 and stored as witness data in an immutable witness data archive 140. This feature as provided by the network operator is generally referred to herein as "witness data collection service(s)." As further discussed below, the targeted UE witness data collection functions 107 may comprise components that include applications running on the processor of the UE 102 and/or applications running on one or more controllers or network functions (NFs), whether physical network functions or virtual network functions, making up the network operator core 106. The immutable witness data archive 140 may comprise an element of a distributed ledger network (DSN) comprising part of, or otherwise coupled to, the network operator core 106. It should be understood that the targeted UE witness data collection functions 107 are configurable to focus on monitoring connection data related to distinct UE 102, rather than a general sweep of connection data involving the collection of UE 102 accessing the RAN 104. As one example, connection data involving a first UE (shown as UE 102-A) in communication with the RAN 104 may be collected and archived in the manners described herein, while connection data for other UE 102 (shown at UE 102-B) in communication with the same RAN 104 as the same time is not collected and archived. In some embodiments, the initiation of collection of connection data involving the first UE 102-A is governed by a subscription to witness data collection services, or otherwise based on a determination of a device type of the UE 102-A, specific automated functions performed by the UE 102-A, and/or the type or service level (for example, the network slice) being offered to that UE by the wireless communications network. In some embodiments, the wireless communications provider may unilaterally elect to initiate witness data collection for a selected UE 102-A.

Figure 1B:
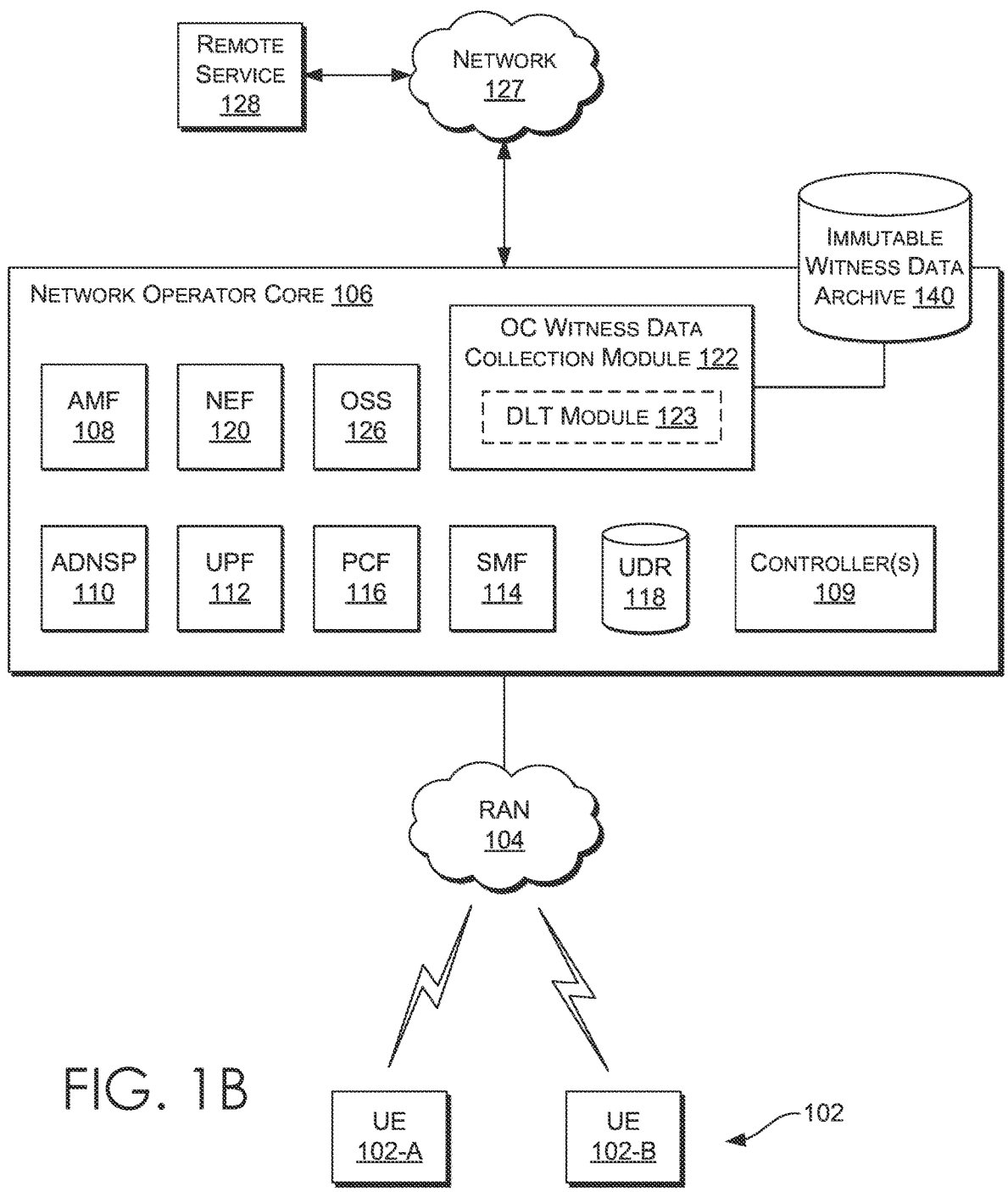

Referring now to FIG. 1B, in this example, network environment 100 is illustrated as further having coupled to the network operator core 106, the immutable witness data archive 140 (which may be a component of a distributed ledger network (DLN)), network 127, and remote service(s) 128.

The network environment 100 is generally configured for wirelessly connecting UE 102 to data or services that may be accessible on one or more application servers or other functions, nodes, or servers (such as remote service 128). In some implementations, the remote services 128 serve as the originating server or servers for operating data (such as environmental data, traffic condition data, navigation and/or other operating commands) delivered to the UE 102-A and utilized for operation of the UE 102-A. In some implementations, the remote service 128 receives input from a machine or human remote operator (e.g., a pilot) that is transmitted to the UE 102-A for directing and controlling actions of the UE 102-A.

It should be understood that in some aspects, the network environment 100 may not comprise a distinct network operator core 106, but rather may implement one or more features of the network operator core 106 within other portions of the network, or may not implement them at all, depending on various carrier preferences.

The network environment 100 is configured for wirelessly connecting the first UE 102 to other UEs via the same RAN, other RAN, or other telecommunication networks such as network 127 or a publicly-switched telecommunication network (PSTN). Generally, each UE 102 is a device capable of unidirectional or bidirectional communication with radio units (also often referred to as radio points or wireless access points) of the RAN 104 using radio frequency (RF) waves.

Still referring to FIG. 1B, in some implementations, the network operator core 106 may comprise modules, also referred to as network functions (NFs), that include one or more of a core access and mobility management function (AMF) 108, an access network discovery and selection policy (ADNSP) 110, a user plane function (UPF) 112, a session management function (SMF) 114, a policy control function (PCF) 116, a network exposure function (NEF) 120, an operations support system (OSS) 126 and an operator core (OC) witness data collection module 122 (which may itself comprise a DLT module 123). Implementation of these network functions may be executed by at least one controller 109 on which the network these one or more network functions are orchestrated or otherwise configured to execute utilizing processors and memory of the one or more controllers 109. Moreover, the network function may be implemented as physical or virtual network functions.

As used herein, the terms "function", "unit", "node" and "module" are used to describe a computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

The AMF 108 facilitates mobility management, registration management, and connection management for 3GPP devices such as a UE 102. ADNSP 110 facilitates mobility management, registration management, and connection management for non-3GPP devices. SMF module 114 facilitates initial creation of protocol data unit (PDU) sessions using session establishment procedures. The PCF 116 maintains and applies policy control decisions and subscription information. Additionally, in some aspects, the PCF 116 maintains quality of service (QoS) policy rules. For example, the QoS rules stored in a unified data repository can identify a set of access permissions, resource allocations, or any other QoS policy established by an operator.

Some aspects of network environment 100 comprises a unified data repository (UDR) 118 for storing information relating to access control. The UDR 118 is generally configured to store information relating to subscriber information and access and may be accessible by multiple different NFs in order to perform desirable functions. For example, the UDR 118 may be accessed by the AMF in order to determine subscriber information, accessed by a PCF 116 to obtain policy related data, accessed by a NEF 120 to obtain data that is permitted for exposure to third party applications. Such subscriber information may include whether a particular UE 102 has access or is eligible to utilize witness data collection services of the wireless network provider.

In addition to being accessible by one or more NFs, such as those described herein, the one or more NFs may also write information to the UDR 118. Similar to the AMF 108, the network environment 100 illustrates the UDR 118 according to a version of the 3GPP 5G architecture; in other network architectures, it is expressly conceived that the UDR 118 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 118. Although depicted as a unified data management module, UDR 118 can be a plurality of network function (NF) specific data management modules.

The UPF 112 is generally configured to facilitate user plane operation relating to packet routing and forwarding, interconnection to a data network, policy enforcement, and data buffering, among others. In aspects where one or more portions of the network environment 100 are not structured according to the 3GPP 5G architecture, the UPF 112 may take other forms, such as a serving/packet gateway (S/PGW).

Notably, the preceding nomenclature is used with respect to the 3GPP 5G architecture; in other aspects, each of the preceding functions and/or modules may take different forms, including consolidated or distributed forms that perform the same general operations. For example, the AMF 108 in the 3GPP 5G architecture is configured for various functions relating to security and access management and authorization, including registration management, connection management, paging, and mobility management; in other forms, such as a 4G architecture, the AMF 108 of FIG. 1A may take the form of a mobility management entity (MME). The network operator core 106 may be generally said to authorize rights to and facilitate access to an application server/service such as remote service 128, requested by any of UE 102.

The operator core witness data collection module 122 is the network operator core 106 implemented component of the targeted UE witness data collection functions 107 and aggregates, arbitrates, and stores witness data for selected UE sessions as immutable data in the immutable witness data archive 140. In some embodiments, the operator core witness data collection module 122 comprises a DLT module 123 such that each archive of UE session witness data is stored in the immutable witness data archive 140 as a distinct distributed ledger entity (e.g., as a block-chain) traceable back to a specific UE 102-A, and comprising connection data associated with a specific session during which the UE 102-A was in connection with the network operator core 106.

Figure 2A:
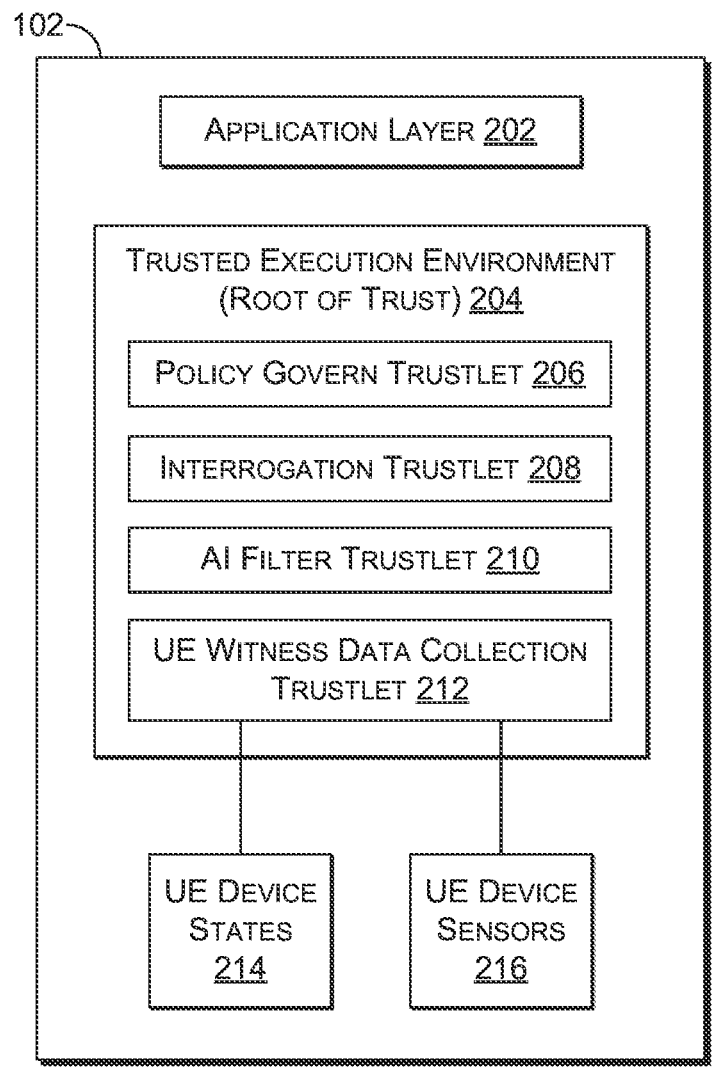
FIG. 2A is a diagram illustrating an example user equipment, in accordance with some embodiments described herein.

FIG. 2A is an illustration of an example UE 102, more specifically a UE 102-A that executes one or more elements of the targeted UE witness data collection functions 107. Here, a UE witness data collection module (or "trustlet") 212 is resident on the UE 102, protected from tempering or manipulation by a hardware Root of Trust and hosted from the Trusted Execution Environment (TEE) 204. Although some UE's may include other systems, generally UE 102 includes at least an application layer 202 and the trusted execution environment 204. The application layer 202 facilitates execution of the UE 102 operating system and executables (including applications). In other words, the application layer 202 provides the direct user interaction environment for the UE 102. TEE 204 facilitates a secure area of the processor(s) of UE 102. That is, TEE 204 provides an environment in the UE 102 where isolated execution and confidentiality features are enforced. Example TEEs include Arm TrustZone technology, Software Guard Extensions (SGX) technology, or similar.

Generally, computer readable code executed in the TEE 204 is referred to as a "trustlet". A trustlet can securely access data stored memory of the UE 102 that is otherwise inaccessible in the application layer 202. A trustlet may take the form of trusted processes, secure processes, isolated user mode (IUM) processes, or the like. For example, a trustlet executed in TEE 204 can access system level data (that is, data related to the larger machine the UE 102 in incorporated within), private and/or public keys, and similar data stored, or accessed, by the UE 102. Trustlets can be activated in response to various network or UE operations. For example, a trustlet can be activated by execution of an associated application in the application layer 202. For another example, a trustlet can be activated in response to a command generated by a network (e.g., network operator core 106 of FIG. 1A) and communicated to the UE 102. The trustlet(s) activated may vary depending on the service requested. For example, a first trustlet may be activated in response to a voice service. A second trustlet may be activated in response to a messaging service. A third trustlet may be activated in response to a data service that facilitates a telemetry update. Similarly, the trustlet(s) activated may vary within a particular type of service. For example, a fourth trustlet may be activated in response to a data service request that facilitates a telemetry update.

Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

As depicted, TEE 204 illustratively includes a policy governing trustlet 206, an interrogation trustlet 208, an artificial intelligence (AI) filter trustlet 210, and the UE witness data collection trustlet 212. Policy governing trustlet 206 corresponds to an illustrative example of computer readable code that is activated in response to execution of an application or operation. Upon activation, policy governing trustlet 206 may access a locally stored set of keys corresponding to the application and the UE's processor. Additionally, policy governing trustlet 206 may access a UE's unique identifier (e.g., an international mobile equipment identity (IMEI)). The policy governing trustlet 206 may communicate the accessed data to a communication network for analysis.

Interrogation trustlet 208 corresponds to an illustrative example of computer readable code that is activated in response to a command from the communication network. An interrogation trustlet can be activated by a command that is generated in response to a determination that UE 102 is an unknown device or that the UE provided anomalous data for a requested network service. In response to activation, an interrogation trustlet may activate other trustlets (e.g., policy governing trustlet 206, UE witness data collection trustlet 212, or any other trustlet), access additional data, or perform any other trustlet operation. The interrogation trustlet may communicate the accessed data to a network. For example, interrogation trustlet 208 is activated in response to a command that the network has requested data from one or more trustlets executed in the trusted execution environment. In some embodiments, the UE witness data collection trustlet 212 is activated by the interrogation trustlet 208 in response to a command from the OC witness data collection module 122 of the network operator core 106.

AI filter trustlet 210 corresponds to an illustrative example of computer readable code that is activated in response to establishment of a network service. In response to activation, an AI filter trustlet monitors the UE while the communication channel facilitating the network service is active. The AI filter trustlet continuously, periodically, or intermittently samples a predetermined set of UE characteristics (e.g., chip state, processor load, sensor input, or the like). The predetermined set of UE characteristics may also be customized based on the active service or combination of services. For example, AI filter trustlet 210 may be activated in response to establishment of a voice service. In such a case, the AI filter trustlet may sample audio input from a microphone, the output of an analog to digital converter, or any other UE characteristic. Similarly, the AI filter trustlet 210 may be activated in response to establishment of a data service or message service and sample the predetermined set of UE characteristics. The AI filter trustlet 210 may communicate the sampled data to a communication network for analysis. In some embodiments, sets of one or both of RF service quality related data or UE telemetry data, are communicated to the UE witness data collection trustlet 212 by the AI filter trustlet 210.

UE witness data collection trustlet 212 corresponds to an illustrative example of computer readable code that is activated in conjunction with initiation of witness data collection services. As such, the UE witness data collection trustlet 212 accesses data generated or otherwise collected by the other trustlets executed within the TEE that is relevant to the connection of the UE 102 with the network operator core 106, as well as connection data known from UE device states 214 and/or measurements from UE device sensors 216. In some embodiments, UE witness data collection trustlet 212 communicates with other trustlets of the TEE 204 in performance of its activities described herein. For example, the UE witness data collection trustlet 212 may optionally be activated by the interrogation trustlet 208 in response to a command from the OC witness data collection module 122 of the network operator core 106. In other embodiments, the UE witness data collection trustlet 212 is activated by the OC witness data collection module 122 without involvement of the interrogation trustlet 208. Also, in some embodiments, the OC witness data collection module 122 may optionally receive information from the UE device states 214 and/or measurements from UE device sensors 216 (such as RF service quality related data or UE telemetry data) via the AI filter trustlet 210.

The connection data compiled by the UE witness data collection trustlet 212 is transported as sequence of UE monitoring session blocks (discussed in further detail below) to the OC witness data collection module 122 where the UE monitoring session blocks are sequenced onto a chain, such as a distributed ledger or block-chain to form a ledger archive. The UE monitoring session blocks may be communicated to the OC witness data collection module 122 sequentially in real time, or alternately stored locally and then sent in batch (for example, to account for a period where a real time uplink to the OC witness data collection module 122 was not available).

Figure 2B:
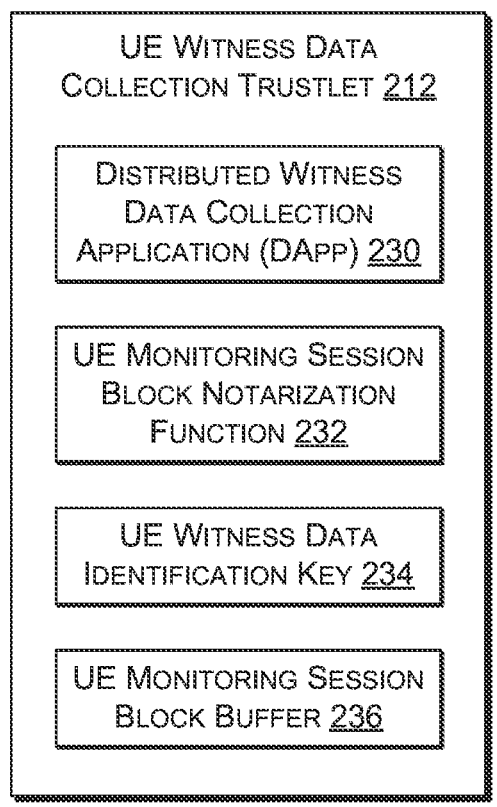
FIG. 2B is a diagram illustrating a UE wireless data collection trustlet of a trusted execution environment for an example user equipment, in accordance with some embodiments described herein.

One example architecture of a UE witness data collection trustlet 212 is shown in FIG. 2B. Here, the computer readable code that is activated comprises a distributed witness data collection application (DApp) 230, and may also include one or more of a UE monitoring session block notarization function 232, a UE witness data identification key 234, and a UE monitoring session block buffer 236. It should be appreciated that various alternate implementations may omit one or more of these elements.

A distributed application, such as DApp 230, comprises a top-tier definition for an application programmable interface (API) that is coded specifically to control a block-chain or distributed ledger instance and, in some implementations, are embedded directly into the blocks themselves (to form what is referred to as a smart contract (SC)).

When a distributed application is implemented as a smart contract, there can be as many stipulations as needed programmed into the smart contract to satisfy the participants (i.e., the wireless network provider and/or the UE owner/operator) that the connection data is gathered with integrity. The preprogramed smart contract establishes the terms upon which the data elements of connection data will determine how transactions and data are represented on a block-chain or ledger. Such a smart contract utilizes "if/when . . . then . . . " rules that govern the data indicators and to explore possible exceptions that might affect the fidelity of the collected connection data and its viability as witness data. In some implementations, exceptions are delegated to a reference chain that contains variations of programming that differ from the priority smart contract program. The data share location where the collected connection data can be securely stored is a component of the UE witness data collection trustlet 212.

Generally, the DApp 230 is placed behind a hardware Root of Trust (e.g., within the TEE 204), providing for total attestation of the connection data placed into UE monitoring session blocks by the DApp 230 and uplinked to the OC witness data collection module 122 in the network operator core 106. The wireless network operator (e.g., the service carrier) will hold the certificates of authority that created any associated secure area (e.g., TrustZone) and those certificates will be stored in a protected space. For example, a UE witness data identification key 234 may be comprised within the UE witness data collection trustlet 212, or within the DApp 230 itself, that authenticates trust in the UE witness data collection trustlet 212 to the OC witness data collection module 122. If the UE 102 does not support a TEE 204 or other hardware root of trust mechanism, then the DApp 230 may instead be implemented in the rich environment (RE) of the UE 102 and utilize a software trust mechanism, though the quality of truth in the connection data is diminished (but still workable). For example, the OC witness data collection module 122 may rely instead on a software root of trust where authentication of the UE 102 (e.g. the UE ID) via standard network access authentication process are utilized in combination with digital notarization stamps on received data (discussed below), and/or generating a distinct hash identity for each session of collected connection data.

The UE monitoring session block notarization function 232 operates to provide a form of self-attestation that data blocks received by the OC witness data collection module 122 were indeed generated by a trusted DApp 230. That is, the UE monitoring session block notarization function 232 stamps UE monitoring session blocks created by the DApp 230 certifying that the DApp 230 is itself certified software that is accurate and free from unauthorized modification or tampering. For example, the notarization stamp may comprise a digital signature (such as but not limited to a public key, a hash of an identification code associated with the DApp 230, or similar authentication) applied to the UE monitoring session blocks. The notarization stamp may be incorporated into the genesis block of each UE monitoring session block sequence and each time a new block of connection data is placed by the DApp 230, that stamp is embedded within it. When the block sequence is subsequently terminated, that notarization stamp will be present on the genesis block, the terminal block, and each block in between. An absence of the notarization stamp would be indicative of a disruption in the process of archiving connection data such that the data of a ledger archive comprising such blocks cannot be validated as true.

The UE monitoring session block buffer 236 provides a local secure memory where collected connection data and/or UE monitoring session blocks are stored for periods of time where connectivity between the US 102 and network operator core 106 is interrupted. When connectivity is restored, the UE 102 can provide from this buffer a record of connection data for the elapsed time where connectivity was down. The notary stamp applied to each block may contain selected validators that prove provenance that thus serves as a certification of truth of the DApp 230. In some embodiments, an imprint of the UE notarization stamp will be transmitted along with the data and stored in every block that was established by the DApp 230, and exist in at least the last block of the ledger archive chains stored to the immutable witness data archive 140, signifying that the stored ledger archive includes only original and unaltered connection data.

Figure 3B:
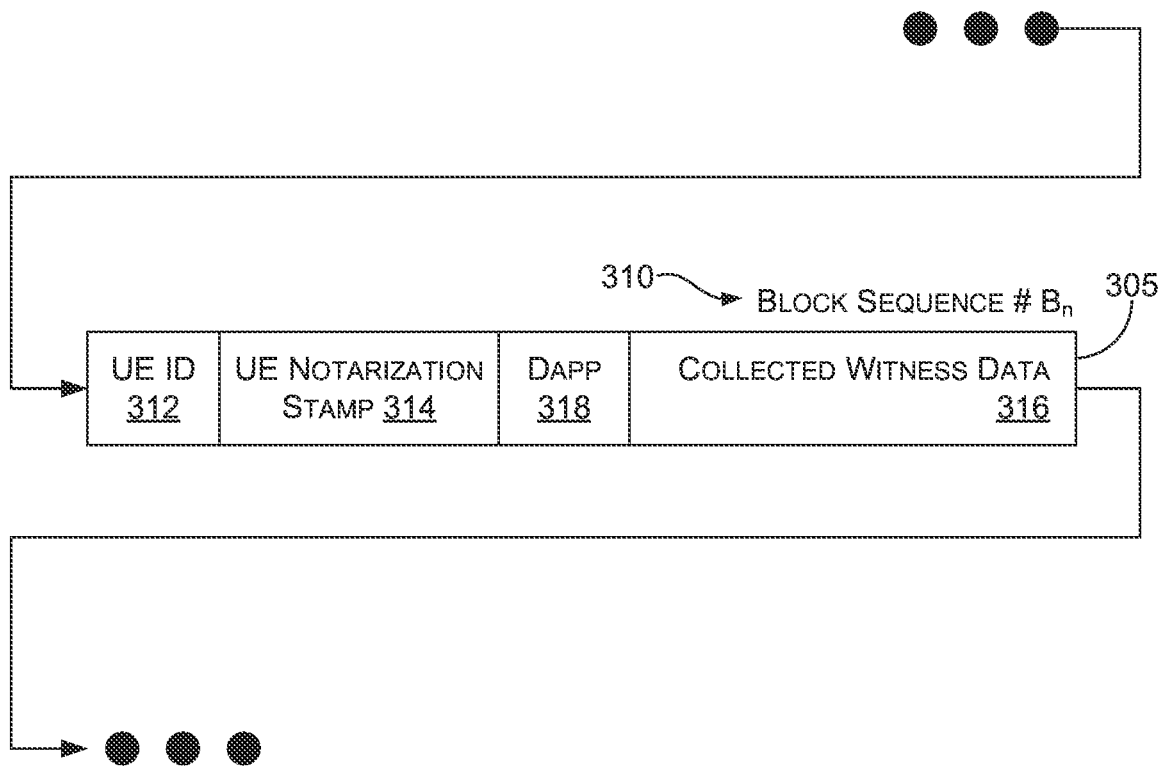

FIG. 3A is a diagram illustrating a UE monitoring session block sequence 300 for communicating connection data collected by the DApp 230. A UE monitoring session block sequence 300 comprises a sequence of UE monitoring session blocks 305, each block 305 associated with a snapshot of connection data captured by the DApp 230 at a point in time. Each block 305 includes a block sequence number 310, a UE ID 312 that includes a unique identification code of the UE 102, a UE notarization stamp 314 embedded into the block 305 by the UE monitoring session block notarization function 232, and collected witness data 316. If the block 305 comprises part of a smart contract, then implementing code associated with the DApp 230 may also be included within the block 305 as illustrated in FIG. 3B at 318.

The first block 305 of the UE monitoring session block sequence 300 is referred to as the "genesis block" of that UE monitoring session block sequence 300 and represents the initial block of the sequence generated by the DApp 230. The specific structure of the genesis block of each block 305 of a UE monitoring session block sequence 300 is defined by the DApp 230, and each subsequent block 305 of the sequence will follow the structure of its genesis block.

The type of data selected by the DApp 230 to serve as collected witness data 316 is determined by the DApp 230 based on what connection data is relevant with respect to the specific UE 102 being monitored. For example, the device type of the UE (whether a cell phone, tablet, automobile, train, boat, aircraft, robot, electronics equipment, or other vehicle or mechanized machinery, for example) and/or specific automated functions performed by the UE (vehicle navigation, passenger or cargo transport, building automation, electrical switching, or other form of actuator operation, for example) may define what connection data is considered relevant. In another example, what connection data is selected to be monitored and collected is defined by terms of a subscription. The type of data selected by the DApp 230 to form the collected witness data 316 may also be based on factors such as the wireless service type or service level being offered to that UE by the wireless communications network. For example, whether a UE 102 is operating on an Enhanced Mobile Broadband (eMBB) 5G network slice, a Massive Machine Type Communications (mMTC) 5G network slice, an Ultra-Reliable Low Latency Communication (uRLLC) 5G network slice, or a Public Safety (PS) 5G network slice, may be considered by the DApp 230 in determining what data should be monitored at the UE 102 and stored into the collected witness data 316 of each block 305.

As shown in FIG. 3A, the final block 305 of the UE monitoring session block sequence 300 is referred to as the "Terminal Block" and indicates the completion of witness data collection for a given UE monitoring session between the UE 102 and the network operator core 106. Reception of the terminal block by the OC witness data collection module 122 triggers the closing of the chain for the ledger archive for the UE monitoring session and its storage to the immutable witness data archive 140.

It should be understood that the term "UE monitoring session" refers to the collection of connection data over a period of time associated with a predefined activity or mission specific to the UE 102. A UE monitoring session may encompass a predetermined period of time, or be defined using different criteria. For example, for a consumer owned autonomous vehicle, a UE monitoring session may include the collection of connection data from the time that the vehicle is turned on and connects to the network operator core 106 until the time that it reaches its destination and disconnects from the network operator core 106. At the completion of that mission, the OC witness data collection module 122 receives the terminal block, closes the ledger archive for that UE monitoring session, and stores the closed ledger archive to the immutable witness data archive 140. Other vehicles may similarly define session durations on a trip-by-trip basis. Alternatively, as another example, the UE 102 may instead comprise a rented vehicle, where the UE monitoring session is intended to coincide with the duration of the rental agreement, and terminates upon final return of the rental vehicle to the rental service. In other implementations, such as for industrial equipment, the UE monitoring session corresponds to a duration or count of operation cycles. Regardless of the specific mission of the UE 102, what scope of time defines a complete UE monitoring session is programmable and may be individually defined for each UE 102. Other examples of criteria for establishing when a mission is complete and a UE monitoring session can be closed includes criteria such as, but not limited to, subscription terms, UE 102 device type, specific automated functions performed by the UE 102, or any of the other criteria discuss herein that characterizes a mission of the UE 102.

It should also be recognized, however, that circumstances may occur that interrupt the uplink of UE monitoring session blocks 305 to the OC witness data collection module 122. These interruptions may be temporary events (such as due to the UE traveling through a zone with no coverage, or atmospheric or RF interference, for example), or long term/permanent interruptions (such as due to a major UE 102 equipment anomaly or disabling event, for example). For long term interruptions, the OC witness data collection module 122 may be programmed with one or more time-out functions that begin to count the time elapsed since the last block 305 was received from the UE 102. The OC witness data collection module 122 would then unilaterally terminate the UE monitoring session with the UE 102 when the time-out function reaches a predefined limit, define the last received block 305 as the terminal block, close the ledger archive for that UE monitoring session, and store the closed ledger archive to the immutable witness data archive 140. When the UE 102 commences a new mission, a new UE monitoring session is created, generating new blocks on a new chain that will be stored as a new ledger archive to the immutable witness data archive 140 upon completion of that new mission.

In other instances, the disruption may be brief or momentary such that the OC witness data collection module 122 should maintain the UE monitoring session as open, and continue appending new blocks received to the sequence after connectivity with the UE 102 is restored. Moreover, it is further desirable to receive and append any omitted blocks 305 that were produced at the UE 102 during the temporary interruption. These would be one or more blocks of connectivity data generated by the DApp 230 and present in the UE monitoring session block buffer 236 awaiting transmission. For example, should an incident occur with the UE 102 during a connectivity interruption, the blocks 305 collected during the interruption would contain witness data indicating factors such as, but not limited to, the quality of service available via the RAN 104 at that time, or whether the UE 102 was connected to another service provider's core network during the time of the incident. Upon reconnection, the OC witness data collection module 122 would receive the buffered blocks 305 and utilize their block sequence numbers to appropriately place them between the previously received blocks and newly received blocks, thus preserving continuity in the chain of witness data collected for that session.

While a substantial amount of witness data comprises connection data obtained directly from the UE 102 being monitored, it should be appreciated that a more comprehensive set of witness data is obtained by collecting trusted data from multiple elements of the network environment 100. This is illustrated generally at 400 in FIG. 4.

Figure 4:
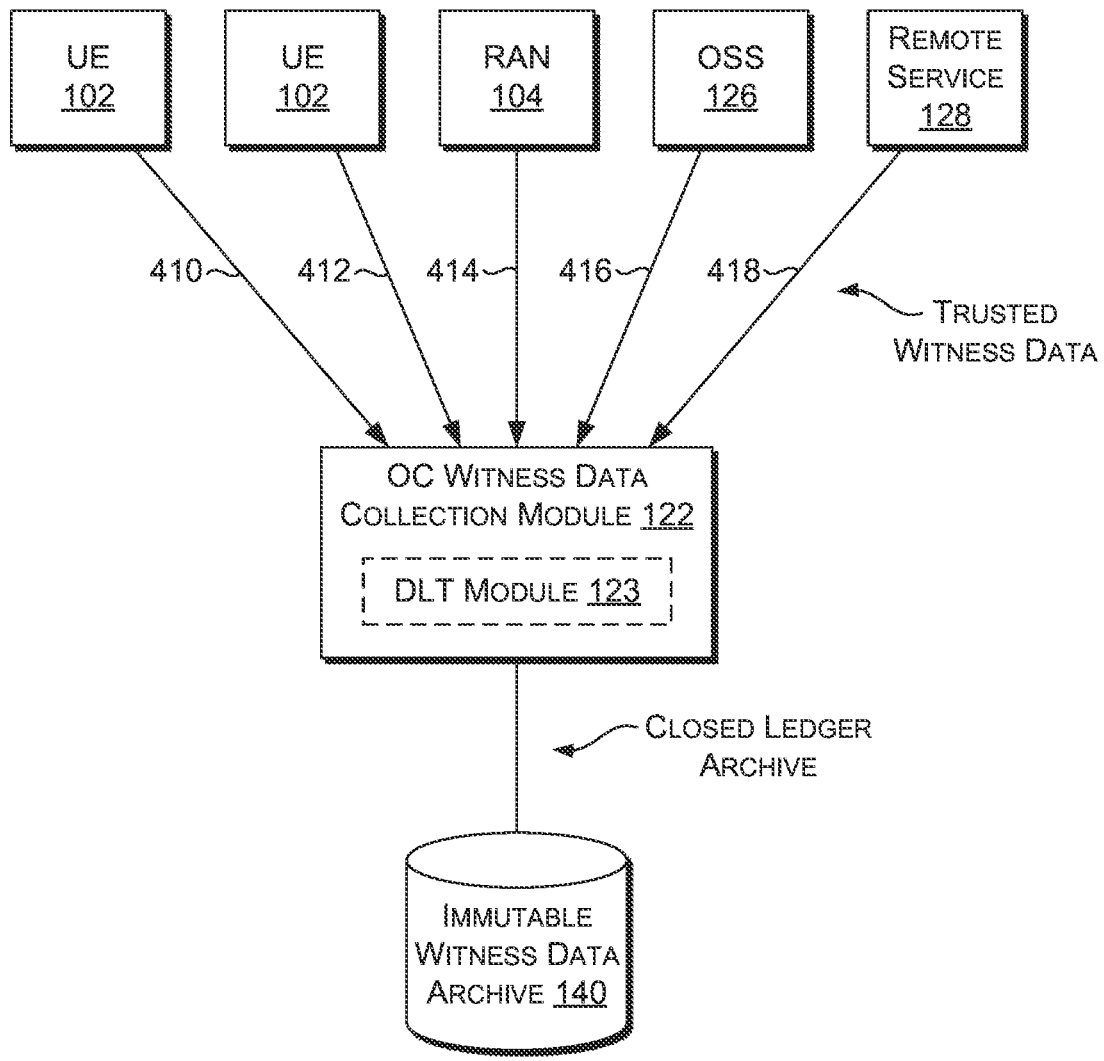
FIG. 4 is a diagram illustrating an example embodiment for collecting comprehensive witness data from across a network, in accordance with some embodiments described herein.

As shown in FIG. 4, the OC witness data collection module 122 can receive trusted witness data from the UE 102 (downlink RF service quality related data 410 and/or UE telemetry data 412), but may also receive trusted witness data from one or more additional sources such as the RAN 104, the OSS 126, or even the remote service 128.

As discussed in detail above, in one example the OC witness data collection module 122 receives downlink RF service quality related data 410 captured by the DApp 230 and communicated via a sequence of UE monitoring session blocks 305. The RF service quality related data 410 can include cell or base station ID information for cells to which the UE is connected to or can otherwise observe, indications of signal strength, interference, or other physical layer information captured by the UE 102. A non-exclusive list of service quality related data 410 includes any of the following: Real-time RF related information of the serving cell and neighboring cells including received signal strength power, signal to noise ratio, and signal interference to noise ratio; Real-time translation of the serving cell to site id, site location, frequency band and frequency bandwidth (for example, the 5G NCGI (NR Cell Global Identity) which combines the Public Land Mobile Network (PLMN) ID and the NR Cell Identity (NCI), or the 4G/LTE (Long-Term Evolution) extended cell global identification (ECGI) constructed from the PLMN ID and the ECI (E-Universals Terrestrial Radio Access Network (UTRAN) Cell Identifier); Live map view information for the serving cell tower, nearby cell towers and the UE's 102 current location; Live plots on geographic maps of categorized breadcrumb trails based on 5G band, Received Signal Strength Indicator (RSSI), Reference Signal Received Power (RSRP), Reference Signal Received Quality (RSRQ), Received Signal Signal-to-Noise Ratio (RSSNR), measured downlink (DL) speed and/r measured uplink (UL) speed; measurements of percent Time on Band and/or Time on Tech (for example, for 3G, 4G (B26), 4G (B25), 4G(B41), 4G (B2), 4G (B4), 4G(B41) 5G NSA (non standalone) and 5G SA (standalone) and Roaming); real time report of serving cell capabilities for multi-input multiple output (MIMO) and massive MIMO (mMIMO) connections, LTE-Adv and GIG-Class; any network speed test information; utilization of carrier aggregation features; beam ID for beamforming antennas; states of connectivity (for example, whether the connection is idle, active, connecting, disconnecting) and mobility status (measurements from neighboring cells, status of handover in progress), system configurations and device capabilities, as well as alarms and faults; and/or information from other carrier log files resident on the UE 102. Regardless of the particular wireless interface technology or standard being implemented, downlink RF service quality related data 410 comprising information from the UE 102 related to downlink signal strength, downlink interference strength, downlink signal frequency and/or downlink signal channel, and downlink transmitter identification (ID) would be the most advantageous to capture and archive.

Witness data from the UE 102 comprising UE telemetry data (shown at 412), when available, includes data such as one or more of device speed, acceleration, rotation, attitude, altitude, position coordinates, operating temperature, pressures, humidity, engine speed, propeller speed, tire pressures, remaining fuel reserves, un-cleared local error codes, system alarms, and/or other UE device states 214 or measurements from onboard UE device sensors 216. While UE telemetry data 412 may be considered useful as witness data, it is understood that for some implementations it is optional, at least some elements of telemetry data may be proprietary to the UE manufacturer and not provided for archive.

The trusted witness data 414 received from the RAN 104 includes information about the operation of the RAN 104 itself, such as cell loading information, cell percent utilization, received uplink signal interference, SNR, SINR, and other RF signal quality metrics concerning the RF environment of the RAN's coverage area.

The OSS 126 is responsible for the management and orchestration of the network operator core 106, and the various physical and virtual network functions, controllers, compute nodes, and other elements that implement the network operator core 106. The trusted witness data 416 from the OSS 126 therefore provides connection data regarding overall core connection statistics such as average latency, packet drop rates, the number of active connections and other network statistics monitored by the core's OSS 126.

In other implementations, an optional additional source of witness data collected by the OC witness data collection module 122 can comprise witness data 418 received from a remote service 128 that originates the operating commands and other data communicated in the downlink direction to the UE 102. Remote service 128 generally facilitates hosting services, data, or both for one or more of the applications executed by UE 102. Delay, disruption or corruption of data relevant to the operation of the UE 102, could cause the UE 102 to malfunction resulting in damage or injury to the UE, other objects, or people on or in proximity to the UE. Additionally, some aspects of remote service 128 may monitor quality-of-service (QoS) parameters associated with the communication link between UE 102 and remote service 128 via the network operator core. In some aspects, a QoS parameter comprises a measure of latency, a measure of data throughput, or both. Some aspects of remote service 128 include a record of desired QoS parameters. For example, a desired QoS parameter can be a maximum latency, a minimum data throughput, or both. Data collected from the remote service 128 therefore can include such QoS information and other data relevant to connectivity with the UE 102. Additional relevant data can include the configuration of a workstation at the remote service 128 that is supplying operating commands and other data. For example, such configuration information may include the memory and/or processing resources available at the remote service 128 and capture if an inadequate configuration of the remote service 128 is potentially responsible for contributing to delay in transmission of commands (for example, from a pilot) to the UE 102, or latency in the network 127.

The OC witness data collection module 122 functions as the aggregator and arbitrator of all witness data it receives from the various sources, verifying that the data is trustworthy and/or from a trustworthy source. Once each snapshot of received witness data is verified, it is added to a block of the ledger archive up until the current UE monitoring session is completed. At that point, the OC witness data collection module 122 closes the chain of the ledger archive, saving it as a closed ledger archive to the immutable witness data archive 140.

Figure 5:
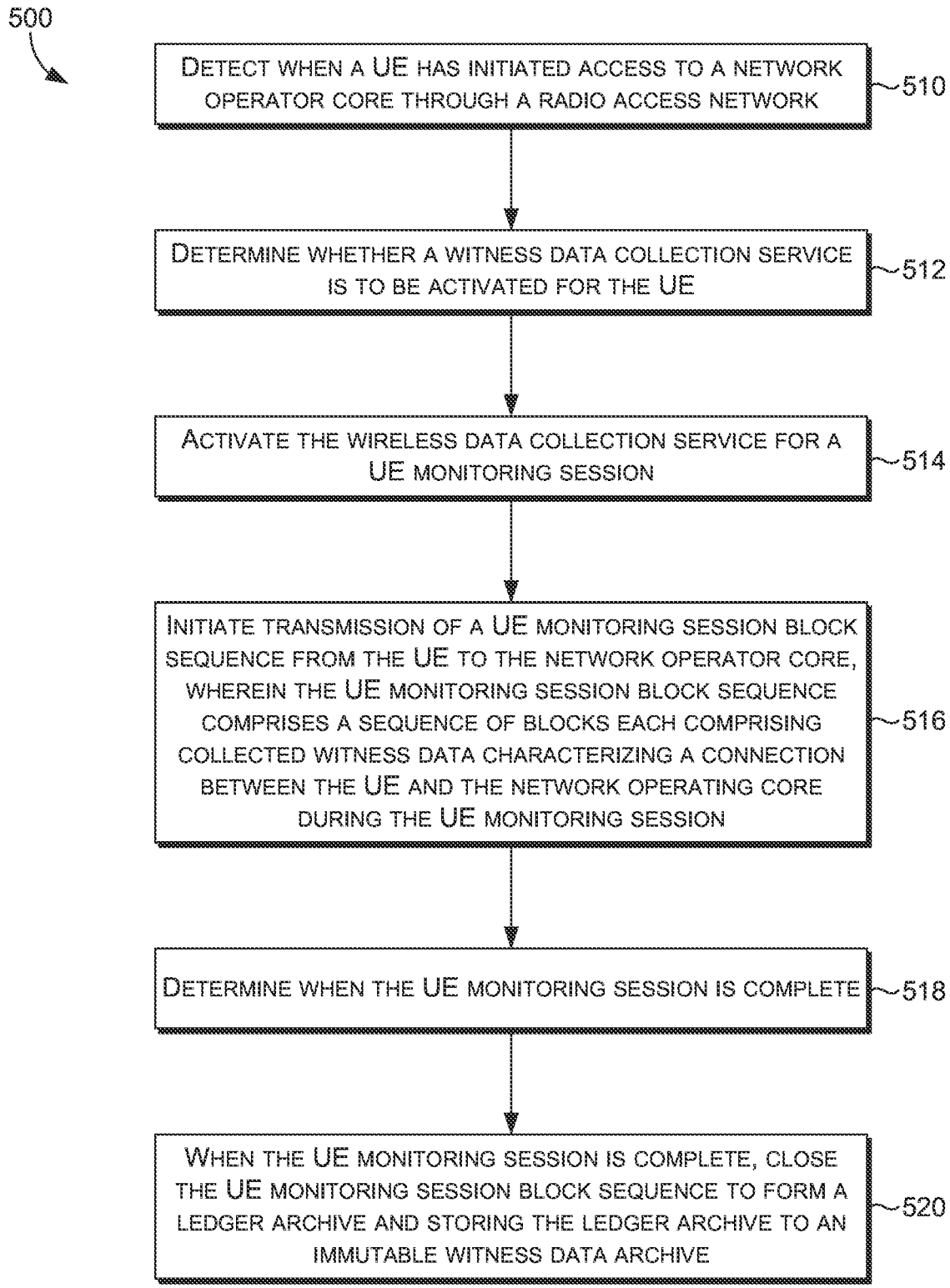
FIG. 5 is a flow chart illustrating an example method for collecting and archiving witness data for a wireless network operator core, in accordance with some embodiments described herein.

FIG. 5 is a flow chart illustrating a method 500 for collecting and archiving witness data for a wireless network operator core. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing one or more of the targeted UE witness data collection functions 107 disclosed above.

The method 500 of FIG. 5 defines a process implemented at the network operator core in which connection data associated with a distinct UE is captured and converted into a ledger archive for storage as an immutable witness data archive. As discussed above, the ledger archive can be generated from blocks or other witness data obtained from the UE and/or other elements such as the RAN and network operator core that make up the network environment. The immutable witness data archive obtains the characterizing of being immutable based on the utilization of DLT, hyperledger technology, or other block-chain technology used to generate the ledger archives as connection data is collected.

The method 500 begin at 510 with detecting by the core operator network of a UE that has initiated access to the core operator network through a radio access network. The UE has authenticated itself to the core network operator using wireless communication standard processes. From that point, the method proceeds to 512 where a determination is be made as to whether witness data collection services are to be activated. In some implementation, the UE can request initiation of witness data archive services upon gaining access to a network connection. For example, the UE authenticates itself using standard handshaking procedures. The UE goes through its boot cycle in its trusted environment where the Distributed Witness Data Collection Application (DApp) determines whether to request access to witness data collection services and if so, makes that request to the network core. In other implementations, the network operator core can invite the UE to activate witness data collection services. For example, the network operator core can test for credentials of the UE and the DApp in the UE and initiate generation of an initial genesis block for capturing witness data at the UE. For example, the network operator core may recognize that the UE has subscribed to witness data collection services, inform the UE that those services are available from the network operator core. As another example, the network operator core will detect characteristics of the UE, such as a UE device type specific automated functions performed by the UE, and/or the type or service level (for example, the network slice) the UE is utilizing to access the wireless communications network. If witness data collection services are to be activated, then the process proceeds to 514 with activating a wireless data collection service for a UE monitoring session. In some implementations, activating the wireless data collection service may include utilizing a key to authenticate a distributed witness data collection application of the UE.

The method proceeds to 516 with instructing a distributed witness data collection application of the UE to initiate transmission of a UE monitoring session block sequence to the network operator core, wherein the UE monitoring session block sequence comprises a sequence of blocks each comprising collected witness data characterizing a connection between the UE and the network operator core over the duration of a UE monitoring session.

The method proceeds to 518 with determining when the UE monitoring session is complete. As discussed above, this determination can be triggered at the network operator core by the reception of a terminal block of the UE monitoring session block sequence, or other criteria. For example, the UE monitoring session may be deemed completed after a predefine time elapses since reception of the last block of collected witness data. In that case, the last block received would be considered the terminal block.

The method proceeds to 520 when the UE monitoring session is completed, closing the UE monitoring session block sequence to form a ledger archive and storing the ledger archive to an immutable witness data archive.

As discussed above, when a UE connects to the network operator core, that connection may be a new connection for a new UE monitoring session, or may be a re-connection after interruption of a prior UE monitoring session. Accordingly, the method can further include after 514 determining when a pending UE monitoring session block sequence associated with the UE is still open. If not, then the method proceeds to 516. However, if a UE monitoring session block sequence associated with the UE is still open, then the method proceeds with instructing the distributed witness data collection application of the UE to initiate transmission of any previously un-transmitted UE monitoring session blocks (that is, blocks that were collected and buffered by the UE for the period of connectivity disruption), and then to 516 with instructing the distributed witness data collection application to continue transmission of the UE monitoring session block sequence to the network operator core.

The connection data included in UE monitoring session block sequence includes RF service quality related data 410 and/or UE telemetry data 412. In other implementations, method 500 further includes aggregating witness data from other sources within the network environment such as the RAN 104, the OSS 126, or remote service 128 as discussed with respect to FIG. 4 above, for inclusion in the ledger archive.

Figure 6:
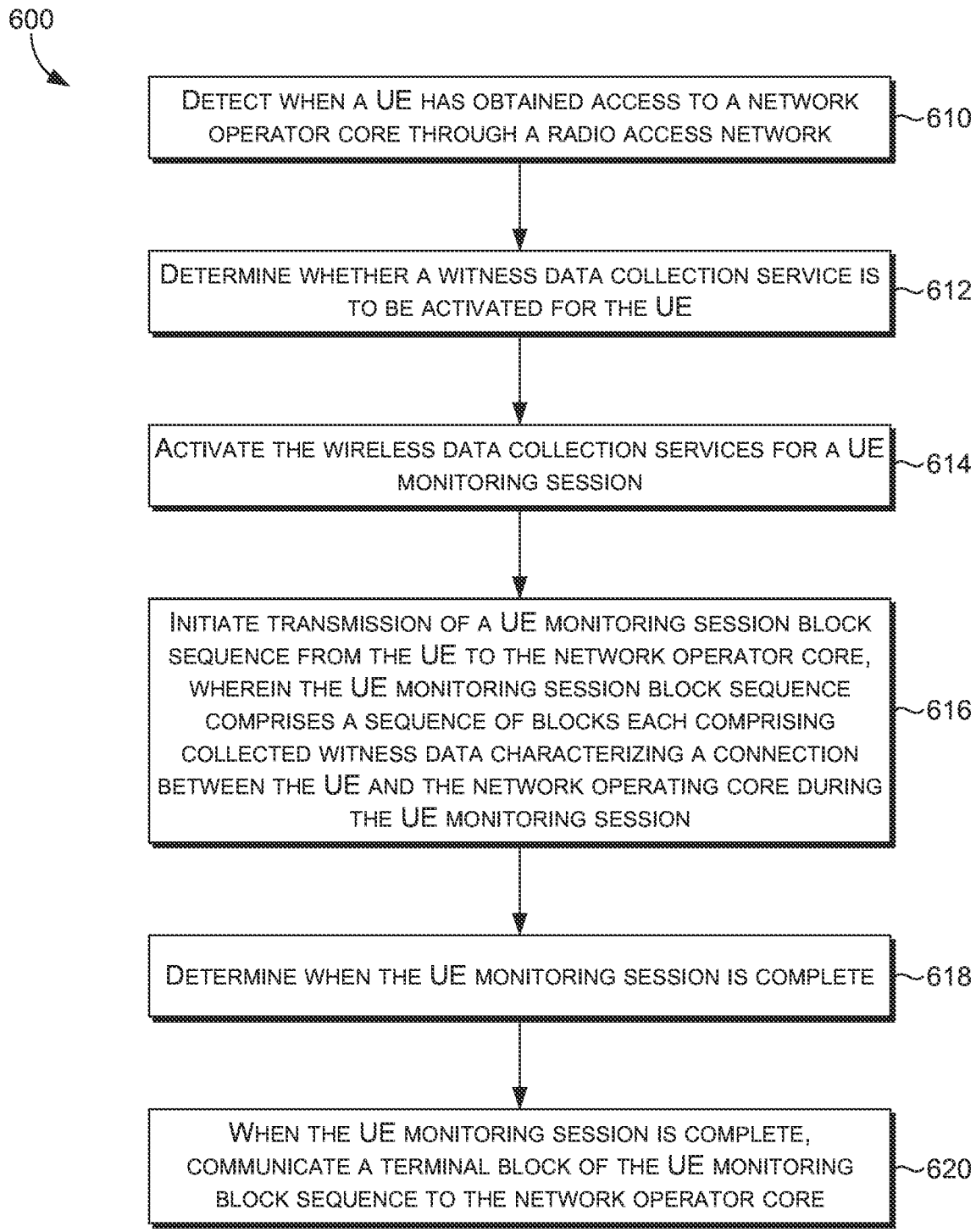
FIG. 6 is a flow chart illustrating an example method for collecting and archiving witness data for a wireless network operator core, in accordance with some embodiments described herein.

FIG. 6 is a flow chart illustrating another method 600 for collecting and archiving witness data for a wireless network operator core. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa.

The method 600 of FIG. 6 defines a process implemented within a UE coupled to the network operator core, in which connection data associated with that UE is captured and delivered to the network operator core to be converted into a ledger archive for storage as an immutable witness data archive. As discussed above, the ledger archive can be generated from blocks or other witness data obtained from the UE and/or other elements such as the RAN and network operator core that make up the network environment. The immutable witness data archive obtains the characterizing of being immutable based on the utilization of DLT, hyperledger, or other block-chain technology used for generating the ledger archives as connection data is collected.

The method 600 begin at 610 with detecting by the UE that it has obtained access to the core operator network through a radio access network. The UE has authenticated itself to the core network operator using wireless communication standard processes. From that point, the method proceeds to 612 where a determination is be made as to whether witness data collection services are to be activated. In some implementation, the UE can request initiation of witness data archive services upon gaining access to a network connection. For example, the UE authenticates itself using standard handshaking procedures. The UE goes through its boot cycle in its trusted environment where the Distributed Witness Data Collection Application (DApp) determines whether to request access to witness data collection services and if so, makes that request to the network core. In other implementations, the network operator core can invite the UE to activate witness data collection services. For example, the network operator core can test for credentials of the UE and the DApp in the UE and initiate generation of an initial genesis block for capturing witness data at the UE. For example, the network operator core may recognize that the UE has subscribed to witness data collection services, inform the UE that those services are available from the network operator core. As another example, the network operator core will detect characteristics of the UE, such as a UE device type specific automated functions performed by the UE, and/or the type or service level (for example, the network slice) the UE is utilizing to access the wireless communications network. If witness data collection services are to be activated, then the process proceeds to 614 with activating wireless data collection services for a UE monitoring session. In some implementations, activating the wireless data collection services may include utilizing a key to authenticate the distributed witness data collection application of the UE to the wireless operator core.

The method proceeds to 616 with the distributed witness data collection application initiating transmission of a UE monitoring session block sequence to the network operator core, wherein the UE monitoring session block sequence comprises a sequence of blocks each comprising collected witness data characterizing a connection between the UE and the network operator core over the duration of a UE monitoring session.

The method proceeds to 618 with determining when the UE monitoring session is complete. As discussed above, the UE monitoring session is complete from the perspective of the UE when it has completed its current mission, and in most cases intentionally terminates it connection from the wireless network core. As such, at 620, the Distributed Witness Data Collection Application can communicate the end of the UE monitoring session by communicating a terminal block of the UE monitoring session block sequence to the network operator core. When the UE monitoring session is completed, the network operator core can proceed with closing the UE monitoring session block sequence to form a ledger archive and storing the ledger archive to an immutable witness data archive.

In various alternative embodiments, system and/or device elements, method steps, or example implementations described throughout this disclosure (such as the network operator core, targeted UE witness data collection functions, immutable witness data archive, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as network operator core, radio access network, user equipment, archive, trustlets, network functions, function, node, module, controller, key, buffer, application layer, trusted execution environment, block, distributed ledger, block-chain, and other terms derived from these words refer to the names of elements that would be understood by one skilled in the art of wireless telecommunications and related industries, and are not used herein as nonce words or nonce terms for the purpose of invoking 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for collecting wireless user equipment connection data for an immutable witness data archive, the system comprising:
   at least one controller configured to execute one or more network functions of a network operator core for a wireless communications network, wherein the network operator core is configured to communicate with one or more user equipment (UE) over one or both of uplink (UL) radio frequency (RF) signals and downlink (DL) RF signals, the one or more network functions including:
   an operator core witness data collection module coupled to an immutable witness data archive, wherein the operator core witness data collection module is configured to receive a UE monitoring session block sequence from a distributed witness data collection application executing on a first UE coupled to the network operator core, the UE monitoring session block sequence comprising a sequence of blocks each comprising collected witness data characterizing a connection between the first UE and the network operator core; and
   wherein the operator core witness data collection module is configured to,
   initiate activation of witness data collection service executed by the first UE upon the first UE gaining access to the network operator core and in response to a determination that the first UE is operating on a predefined network slice of a plurality of network slices maintained by the network operator core, wherein the network slice is selected from the plurality of network slices based on a class of device associated with the first UE;
   store the UE monitoring session block sequence as a ledger archive to the immutable witness data archive based on when a UE monitoring session associated with the first UE is completed,
   prior to determination that the UE monitoring session is complete, detect a disconnection event between the first UE and the wireless communications network facilitating access to the network operator core,
   responsive to detecting the disconnection, initiate a time-out counter that computes a duration between a time when a previous block in the sequence of blocks was received and a current time,
   prior to determining that the UE monitoring session is complete and subsequent to initiating the time-out counter, detect a reconnection event between the first UE and the wireless communications network facilitating access to the network operator core,
   responsive to detecting the reconnection event, compare the duration associated with the time-out counter and a predetermined duration threshold,
   responsive to a determination that the duration is less that the predetermined duration threshold, determine when the UE monitoring session block sequence associated with the first UE is still open,
   when the UE monitoring session block sequence associated with the first UE is still open,
   instruct the first UE to initiate transmission of any previously un-transmitted UE monitoring session blocks, and
   instruct the first UE to continue transmission of the UE monitoring session block sequence to the network operator core.

2. The system of claim 1, wherein the collected witness data comprises one or both of RF service quality related data or UE telemetry data.

3. The system of claim 2, wherein the RF service quality related data comprises connection data from the first UE related to at least one of:
   downlink signal strength;
   downlink interference strength;
   downlink signal frequency;
   downlink signal channel; and
   a downlink transmitter identification; and
   wherein the UE telemetry data comprises connection data from the first UE related to at least one of:
   speed, acceleration, rotation, attitude, altitude, position coordinates, operating temperature, pressures, humidity, engine speed, propeller speed, tire pressures, remaining fuel reserves, un-cleared local error codes, system alarms, UE device states and measurements from onboard UE device sensors.

4. The system of claim 1, further comprising a radio access network (RAN) coupled to the network operator core, wherein the first UE is in communication with the network operator core via the RAN, wherein the ledger archive further comprises witness data from the RAN comprising at least one of:
   cell loading information;
   cell percent utilization;
   received uplink signal interference; and
   RF signal quality metrics.

5. The system of claim 1, wherein the network operator core further comprises an operations support system (OSS), wherein the ledger archive further comprises witness data from the OSS comprising at least one of:
   core connection statistics;
   average latency;
   packet drop rates;
   a number of active connections; and
   network statistics monitored by the OSS.

6. The system of claim 1, wherein the network operator core is further coupled to a remote service via a network, wherein the ledger archive further comprises witness data from the remote service comprising at least one of:

quality-of-service (QOS) parameters associated with a communication link between the first UE and the remote service via the network operator core; and
a configuration information for of a workstation at the remote service.

7. The system of claim 1, wherein the operator core witness data collection module generates the ledger archive using at least one of a distributed ledger technology (DLT), a Hyperledger technology, or a block-chain technology.

8. The system of claim 1, further comprising a Trusted Execution Environment (TEE) resident on the first UE, wherein the distributed witness data collection application is implemented by a UE witness data collection trustlet in the TEE.

9. The system of claim 8, wherein the UE witness data collection trustlet further includes a UE monitoring session block notarization function configured to apply a UE notarization stamp to one or more UE monitoring session blocks of the UE monitoring session block sequence, the UE notarization stamp certifying that the distributed witness data collection application is certified software and free from unauthorized modification or tampering.

10. A method for collecting and archiving witness data for user equipment (UE) in communication with a wireless network operator core, the method comprising:
    detecting when a UE has initiated access to a network operator core through a radio access network;
    upon gaining access to the network operator core via a network slice of a plurality of available network slices, initiating a witness data collection service of a UE monitoring session for the UE, wherein at least a portion of the witness data collection service executes within a trusted execution environment of the UE;
    initiating transmission of a UE monitoring session block sequence from the UE to the network operator core, wherein the UE monitoring session block sequence comprises a sequence of blocks each comprising collected witness data characterizing a connection between the UE and the network operator core during the UE monitoring session;
    prior to determining that the UE monitoring session is complete, detecting a disconnection event between the UE and the radio access network facilitating access to the network operator core;
    responsive to detecting the disconnection, initiating a time-out counter that computes a duration between a time when a previous block in the sequence of blocks was received and a current time;
    prior to determining that the UE monitoring session is complete and subsequent to initiating the time-out counter, detecting a reconnection event between the UE and the radio access network facilitating access to the network operator core;
    responsive to detecting the reconnection event, comparing the duration associated with the time-out counter and a predetermined duration threshold;
    responsive to a determination that the duration is less that the predetermined duration threshold, determining when the UE monitoring session block sequence associated with the UE is still open;
    when the UE monitoring session block sequence associated with the UE is still open;
    instructing the UE to initiate transmission of any previously un-transmitted UE monitoring session blocks; and
    instructing the UE to continue transmission of the UE monitoring session block sequence to the network operator core;
    determining when the UE monitoring session is complete; and
    when the UE monitoring session is complete, closing the UE monitoring session block sequence to form a ledger archive and storing the ledger archive to an immutable witness data archive.

11. The method of claim 10, wherein the collected witness data comprises one or both of RF service quality related data or UE telemetry data.

12. The method of claim 10, wherein the collected witness data comprises connection data from the UE related to at least one of:
    downlink signal strength;
    downlink interference strength;
    downlink signal frequency;
    downlink signal channel; and
    a downlink transmitter identification.

13. The method of claim 10, wherein the ledger archive further comprises witness data for a radio access network (RAN) coupled to the network operator core, wherein the UE is in communication with the network operator core via the RAN and the witness data comprises at least one of:
    cell loading information;
    cell percent utilization;
    received uplink signal interference; and
    RF signal quality metrics.

14. The method of claim 10, wherein the ledger archive further comprises witness data from an operations support system (OSS) of the network operator core, and the witness data comprises at least one of:
    core connection statistics;
    average latency;
    packet drop rates;
    a number of active connections; and
    network statistics monitored by the OSS.

15. The method of claim 10, wherein the network operator core is further coupled to a remote service via a network, wherein the ledger archive further comprises witness data from the remote service comprising at least one of:
    quality-of-service (QOS) parameters associated with a communication link between the UE and the remote service via the network operator core; and
    a configuration information for of a workstation at the remote service.

16. The method of claim 10, wherein the ledger archive comprises at least one of a distributed ledger technology (DLT), a Hyperledger technology, or a block-chain technology.

17. A method for collecting and archiving witness data for user equipment (UE) in communication with a wireless network operator core, the method comprising:
    detecting when a UE has obtained access to a network operator core through a radio access network;
    upon gaining access to the network operator core via a network slice of a plurality of available network slices, initiating a witness data collection service of a UE monitoring session for the UE, wherein at least a portion of the witness data collection service executes within a trusted execution environment of the UE;
    initiating transmission of a UE monitoring session block sequence from the UE to the network operator core, wherein the UE monitoring session block sequence comprises a sequence of blocks each comprising collected witness data characterizing a connection between the UE and the network operator core during the UE monitoring session;

prior to determining that the UE monitoring session is complete, detecting a disconnection event between the UE and the radio access network facilitating access to the network operator core;

responsive to detecting the disconnection, initiating a time-out counter that computes a duration between a time when a previous block in the sequence of blocks was received and a current time;

prior to determining that the UE monitoring session is complete and subsequent to initiating the time-out counter, detecting a reconnection event between the UE and the radio access network facilitating access to the network operator core;

responsive to detecting the reconnection event, comparing the duration associated with the time-out counter and a predetermined duration threshold;

responsive to a determination that the duration is less that the predetermined duration threshold, determining when the UE monitoring session block sequence associated with the UE is still open;

when the UE monitoring session block sequence associated with the UE is still open;

instructing the UE to initiate transmission of any previously un-transmitted UE monitoring session blocks;

instructing the UE to continue transmission of the UE monitoring session block sequence to the network operator core;

determining when the UE monitoring session is complete; and when the UE monitoring session is complete, communicating a terminal block of the UE monitoring session block sequence to the network operator core.

18. The method of claim 17, wherein the collected witness data comprises one or both of RF service quality related data or UE telemetry data.

19. The method of claim 17, wherein the collected witness data comprises connection data for the UE related to at least one of:

downlink signal strength;
downlink interference strength;
downlink signal frequency;
downlink signal channel; and
a downlink transmitter identification.

* * * * *